United States Patent [19]

Kajikawa et al.

[11] Patent Number: 5,478,879
[45] Date of Patent: Dec. 26, 1995

[54] METHOD FOR PRODUCTION OF ABSORBENT RESIN

[75] Inventors: Katsuhiro Kajikawa, Himeji; Yoshihiko Masuda, Takarazuka; Kinya Nagasuna; Yoshio Irie, both of Himeji, all of Japan

[73] Assignee: Nippon Shokubai Co., Ltd., Osaka, Japan

[21] Appl. No.: 822,916

[22] Filed: Jan. 21, 1992

[30] Foreign Application Priority Data

Jan. 22, 1991 [JP] Japan ................... 3-005737

[51] Int. Cl.$^6$ ............ C08J 3/00; C08K 3/20; C08L 33/00
[52] U.S. Cl. ............ 524/500; 524/502; 524/916; 528/502 R
[58] Field of Search .......... 524/500, 502, 524/916; 528/502

[56] References Cited

U.S. PATENT DOCUMENTS

| | | | |
|---|---|---|---|
| 4,103,080 | 7/1978 | Bohmer et al. | 526/303.1 |
| 4,920,202 | 4/1990 | Irie et al. | 526/307.7 |
| 4,950,692 | 8/1990 | Lewis | 521/45 |
| 4,970,267 | 11/1990 | Bailey | 525/344 |
| 5,064,582 | 11/1991 | Sutton et al. | 264/37 |

FOREIGN PATENT DOCUMENTS

| | | |
|---|---|---|
| 0401044 | 12/1990 | European Pat. Off. . |
| 0417761 | 3/1991 | European Pat. Off. . |
| 61-101536 | 5/1986 | Japan . |
| 61-97333 | 5/1986 | Japan . |
| 62-230813 | 10/1987 | Japan . |
| 63-210108 | 8/1988 | Japan . |
| 2233656 | 1/1991 | United Kingdom . |

*Primary Examiner*—Paul R. Michl
*Assistant Examiner*—Patrick Niland
*Attorney, Agent, or Firm*—Burns, Doane, Swecker & Mathis

[57] ABSTRACT

A method for the production of an absorbent resin, which method comprises mixing 100 parts by weight of (A) a hydrated gel of absorbent resin which is resulted from aqueous solution polymerization having a polymerization ratio in the range of from 60 to 99%, an average particle diameter in the range of from 0.1 to 200 mm, a water content in the range of from 30 to 90% by weight, and a temperature in the range of from 40° to 110° C., with from 1 to 50 parts by weight of (B) a substantially dry fine absorbent resin powder having an average particle diameter smaller than the average particle diameter assumed by said hydrated gel of absorbent resin (A) while in a dried state, then raising the polymerization ratio of said hydrated gel of absorbent resin (A) to a level higher than the polymerization ratio of said hydrated gel when being mixed.

38 Claims, No Drawings

METHOD FOR PRODUCTION OF ABSORBENT RESIN

BACKGROUND OF THE INVENTION

1. Field of the Invention

This invention related to a method for the production of an absorbent resin. More particularly, it related to a method for economically advantageous production of an absorbent resin which possesses a firm particulate structure even when it is wetted with an absorbed liquid in spite of the origin thereof in recycled fine particles of absorbent resin, and excels in the handling property and various absorbent characteristics.

2. Description of the Prior Art

In recent years, the absorbent resin has found utility in various fields involving sanitary materials such as disposable diapers and sanitary napkins, agricultural and horticultural water-retaining agents, and industrial dehydrators. Generally, when the absorbent resin is to be used as these various uses, there are the optimum particle diameter of the absorbent resin therefor the used. The conventional absorbent resin generally contains an appreciable proportion of fine particles having diameters smaller than the diameter most favorable for the application.

The use of the absorbent resin of this quality is, however, found following problems.

(1) The absorbent resin, while being handled, tends to emit dust and consequently jeopardizes the work environment and suffers from waste of supply.

(2) The absorbent resin, while absorbing a liquid, tends to form fish eyes and obstructs diffusion of the liquid and, when used as in a disposable diaper, tends to entail leakage.

(3) The absorbent resin, when to be mixed with other substance, exhibits poor mixability or dispersibility and defies uniform mixture as with soil.

(4) The absorbent resin possesses poor flowability and, therefore, tends to form bridges of resin particles inside a hopper and entail the phenomenon of flushing.

As measures for solution of these problems, techniques for the aggregation of absorbent resin and techniques for recycling of fines form the absorbent resin have been reported. As the techniques for aggregation, for example, a method which effects aggregation of fine particles of absorbent resin through water or water and a water-soluble polymer or water and inorganic powder [JP-A-61-97,333 (1986) and JP-A-61-101,536 (1986)], a method which effects aggregation of an absorbent resin fine powder by dispersing the powder in a organic solvent, adding an aqueous solution of monomer to the resultant dispersion thereby allowing the dispersion to absorb the aqueous monomer solution, and then polymerizing the monomer [JP-A-62-230,813 (1987)], and a method which attains aggregation of an absorbent resin power by preparing an organic solvent containing a hydrated gel of absorbent resin obtained by the reverse-phase suspension polymerization technique, adding the absorbent resin fine power to the organic solvent, and subjecting the resultant mixture to azeotropic dehydration [JP-A-63-210,108 (1988)] have been known to the art. Then, as the techniques for recycling of fine powder, a method which effects recycling of an absorbent resin powder by swelling the fine powder with an amount of water enough to form a continuous amorphous gel and crushing the dried gel (U.S. Pat. No. 4,950,692), a method which accomplishes recycling of an absorbent resin powder by mixing the powder with an aqueous solution of cross-linking agent thereby forming a gel-like mass, subjecting the mass to a cross-linking reaction, drying the cross-linked mass, and crushing the dry mass (EP-A-401,044), and a method which attains recycling of an absorbent resin powder by mixing the dry powder and the water simultaneously with the spraying by the use of shear stress high enough for the powder to be substantially completely hydrated and discharged from the site of the mixture without inducing flocculation, then intimately blending a viscous material with the hydrated powder in a separate site of mixture with shear stress of a medium degree capable of producing a substantially homogenous product (EP-A-0 417,761), for example, have been known to the art.

The aggregates produced by the methods of JP-A-61-97,333 (1986) and JP-A-61-101,536 (1986), however, have no sufficient strength and, while being conveyed in a plant line or on a vehicle, have the possibility of sustaining partial fracture and consequently regenerating fine particles. By the method of JP-A-62-230,813 (1987), the whole absorbent resin uniformly absorbs the aqueous solution of monomer only with difficulty, the aggregation is formed in a low proportion to the whole powder used. And the aqueous solution of monomer is polymerized as excessively penetrated in the resin powder, the absorbent resin consequently suffers from a lowered absorptive capacity. Though the method of JP-A-63-210,108 (1988) indeed is capable of producing aggregate particles, the particles produced thereby at all have low agglomeration strength, regenerate fine gel while being swelled with absorbed liquid, and retard permeation and diffusion of liquid.

Since the methods disclosed in U.S. Pat. No. 4,950,692, EP-A-0 401,044, and EP-A-0 417,761 require the absorbent resin powder to be preparatorily swelled by addition thereto of water or an aqueous solution of cross-linking agent and then the swelled resin powder to be dried, they are not only complicate and difficult in point of operation but also disadvantageous in point of economy. The dry particles which are formed solely of the absorbent resin powder produced as taught in U.S. Pat. No. 4,950,692, when they are swelled with absorbed liquid, suffer substantially all the fine particles used therein to be regenerated in the form of fine gel and, therefore, are deficient in the ability to permit permeation and diffusion of liquid. The method of EP-A-0 401,044 has the disadvantage that since the cross-linking agent permeates the fine particles of the absorbent resin powder to their cores in conjunction with a large amount of water and effects a cross-linking reaction therein, the dry powder to be eventually produced suffers a very poor absorptive capacity.

An object of this invention, therefore, is to provide a novel method for the production of an absorbent resin.

Another object of this invention is to provide a method for economically advantageous production of an absorbent resin which possesses a heretofore unattainable firm microstructure even while it is being swelled with absorbed liquid in spite of the origin thereof in recycled fine particles of absorbent resin and excels in the handling property and various absorbent characteristics.

SUMMARY OF THE INVENTION

These objects are accomplished by a method for the production of an absorbent resin, which method comprises mixing 100 parts by weight of (A) a hydrated gel of an absorbent resin which is resulted from aqueous solution polymerization having a polymerization ratio in the range of from 60 to 99%, an average particle diameter in the range of from 0.1 to 200 mm, a water content in the range of from 30 to 90% by weight, and a temperature in the range of from 40° to 110° C. with from 1 to 50 parts by weight of (B) a substantially dry fine absorbent resin powder having an average particle diameter smaller than the average particle diameter which the hydrated gel of absorbent resin (A) assumes when the hydrated gel is held in a dried state, then raising the polymerization ratio of the hydrated gel of absorbent resin (A) above the polymerization ratio thereof at the time of the mixture.

The objects are further accomplished by a method for the production of an absorbent resin having a cross-linked surface region each in the individual particles thereof, which method comprises mixing 100 parts by weight of (A) a hydrated gel of an absorbent resin which is resulted from aqueous solution polymerization having a polymerization ratio in the range of from 60 to 99%, an average particle diameter in the range of from 0.1 to 200 mm, and a water content in the range of from 30 to 90% by weight, and a temperature in the range of from 40° to 110° C. with from 1 to 50 parts by weight of (B) a substantially dry fine absorbent resin powder having an average particle diameter smaller than the average particle diameter which the hydrated gel of absorbent resin (A) assumes when the hydrated gel is held in a dried state and then raising the polymerization ratio of the hydrated gel of absorbent resin to be treated and mixing the absorbent resin to be treated with (D) a cross-linking agent and subjecting the resultant mixture to a cross-linking reaction.

Our diligent study conducted in search of an absorbent resin capable of realizing the objects described above has led us to find that by mixing the surface of a hydrated gel of absorbent resin undergoing polymerization at a ratio in a specific range, having specific particle diameter and water content, and remaining at a temperature in a specific range with a substantially dry fine absorbent resin powder having an average particle diameter smaller than the average particle diameter which the hydrated gel assumes in a dried state and then further raising the polymerization ratio of the hydrated gel, the fine absorbent resin powder is bound firmly to the surface part of the hydrated gel and an absorbent resin which possesses a firm microstructure enough to avoid ready regeneration of fine powder or a fine gel originating in the fine powder during conveyance of the resin though a plant line or transportation thereof on a vehicle or while the resin is being swelled with an absorbed liquid is easily obtained and further that by cross-linking the surface region each of the individual particles of the absorbent resin obtained as described above and possessing the aforementioned properties, resulted absorbent resin having a cross-linked surface region possesses a firmer particle strength equal to that of primary particles even under a shear force exerted thereon while in a swelled state, avoids easily regenerating a fine gel originating in the fine powder, and excels in various absorption characteristics such as absorptive capacity and liquid permeability. This invention has been perfected as a result.

The absorbent resin which is produced by the method of this invention retains a firm particle structure while is is being swelled with absorbed liquid, avoids readily regenerating fine powder during conveyance thereof in a plant line or transportation thereof on a vehicle or during use thereof in a varying application, allows the work environment to remain always in a fine condition, excels in various absorption characteristics such as absorptive capacity and permeation and diffusion of liquid, and ideally fits various uses such as sanitary materials and agricultural and horticultural and industrial water-retaining agents.

EXPLANATION OF THE PREFERRED EMBODIMENT

The hydrated gel of absorbent resin (A) which can be used in this invention is a product of aqueous solution polymerization possessing an irregular form, undergoing polymerization in a ratio in the range of from 60 to 99%, possessing an average particle diameter in the range of from 0.1 to 200 mm and a water content in the range of from 30 to 90%, and remaining at a temperature in the range of from 40° to 110° C. A hydrated gel which is produced by the water-in-oil type or reversed-phase suspension polymerization has a spherical form, and the gel of this type generally retains as a residue on the surface of individual particles thereof a dispersant such as surfactant which was used during the polymerization. From this hydrated gel, an absorbent resin which retains a firm particle structure even while being swelled with absorbed liquid as intended by this invention is not produced. It is essential that the hydrated gel of absorbent resin (A) possess a polymerization ratio in the range of from 60 to 99%. If this polymerization ratio is lower than 60%, the produced absorbent resin suffers from an unduly low absorption ratio because the monomer excessively permeates the fine absorbent resin powder (B) and forms a cross-linked structure excessively as by graft reaction. Conversely, if the polymerization ratio exceeds 99%, the produced absorbent resin is liable to regenerate fine powder while being swelled with liquid because the surface region of the hydrated gel is bound weakly with the fine absorbent resin powder (B). Preferably, the polymerization ratio is in the range of from 80 to 98%.

The hydrated gel of absorbent resin (A) has an average particle diameter in the range of from 0.1 to 200 mm. For the production of the hydrated gel having this average particle diameter, there can be adopted a method which comprises producing a hydrated gel by aqueous solution polymerization and mechanically disintegrating and cutting the polymer as it is produced or a method which comprises allowing the polymerization to proceed until the ratio thereof reaches a level in the range of from 60 to 99% and thereafter mechanically disintegrating and cutting the polymer formed consequently.

If the average particle diameter exceeds 200 mm, the produced absorbent resin is liable to regenerate fine powder while being swelled with liquid because the hydrated gel (A) has only a small surface area and the surface region of the hydrated gel (A) does not allow sufficient presence therein of the fine absorbent resin powder (B). Generally, the hydrated gel (A) is disintegrated and cut into particles of an average diameter of not more than 0.1 mm only with difficulty. Preferably, the average particle diameter is in the range of form 0.5 to 20 mm.

The hydrated gel of absorbent resin (A) has a water content in the range of from 30 to 90% by weight. For the production of the hydrated gel (A) which has a water content in the range of 30 to 90% by weight, it suffices to subject an aqueous solution containing a monomer in the concentration of from about 10 to about 70% by weight to aqueous solution polymerization by the known technique. It is also permissible to use the aqueous solution containing the monomer in a concentration deviating form the range mentioned above and then adjust the water content of the produced polymer in the range mentioned above. If this water content is not more than 30% by weight, the bonding of the hydrated gel (A) with the fine absorbent resin powder (B) is weak. Conversely, if the water content exceeds 90% by weight, the disadvantage ensues that the drying is obtained only with difficulty. Preferably, the water content is in the range of form 55 to 75% by weight.

The temperature at which the hydrated gel of absorbent resin (A) is mixed with the fine absorbent resin powder (B) is in the range of from 40° to 110° C. If this temperature is lower than 40° C., the possibility arises that the ratio of adhesiveness of adjacent hydrated gel particles is increased, the thoroughness of mixture of the hydrated gel (A) with the fine absorbent resin powder (B) is unduly decreased, and the quality of the product is degraded. Conversely, if the temperature of the hydrated gel rises beyond 110° C., the possibility ensures that the gel is boiled under normal pressure to the extend of rendering the mixture difficult.

The composition of the hydrated gel of absorbing resin (A) has no particular restriction except for the requirement that it enable the gel to absorb water and swell with the absorbed water. Generally, this hydrated gel is obtained by polymerizing and cross-linking a water-soluble unsaturated monomer.

The water-soluble unsaturated monomers which are effectively usable herein include anionic monomers such as (meth)acrylic acid, (anhydrous) maleic acid, fumaric acid, crotonic acid, itaconic acid, 2-(meth)acryloyl ethanesulfonic acid, 2-(meth)acryloyl propanesulfonic acid, 2-(meth)acrylamide-2-methyl propanesulfonic acid, vinyl sulfonic acid, and styrene sulfonic acid and salts thereof; nonionic hydrophilic group-containing monomers such as (meth)acrylamides, N-substituted (meth)acrylamides, 2-hydroxyethyl (meth)acrylates, 2-hydroxypropyl (meth)acrylates, methoxy polyethylene glycol (meth)acrylates, and polyethylene glycol (meth)acrylates; amino group-containing unsaturated monomers such as N,N-dimethylaminoethyl (meth)acrylates, N,N-dimethylaminopropyl (meth)acrylates, and N,N-dimethylaminopropyl (meth)acrylates and quaternization products thereof, and acrylic esters such as methyl (meth)acrylates and ethyl (meth)acrylates, for example. One member or a mixture of two or more members suitable selected from among the monomers cited above may be used. With due consideration for the various absorption characteristics expected of the finally produced absorbent resin, use of at least one member selected from the group consists of (meth)acrylic acid (and salts thereof), 2-(meth)acryloyl ethanesulfonic acid (and salts thereof), 2-(meth)acrylamide-2-methylpropanesulfonic acid (and salts thereof), (meth)acrylamides, methoxy polyethylene glycol (meth)acrylates, N,N-dimethylaminoethyl (meth)acrylates, and quaternization products thereof proves to be desirable. More desirably, the member so selected contains (meth)acrylic acid (or a salt thereof) as an essential component. In this case, 30 to 90% of the (meth)acrylic acid is neutralized with a basic substance.

The hydrated gel of absorbent resin (A) may be either of the self-cross-linking type to be obtained without use of a cross-linking agent or of the type to be obtained by using a cross-linking agent possessing a polymerizable unsaturated group and/or a reactive functional group in an amount enough for the gel strength of the hydrated gel of absorbent resin (A) to reach a desired level.

The cross-linking agents which are effectively usable herein include N,N-methylenebis(meth)acrylamide, (poly)ethylene glycol di(meth)acrylate, glycerol tri(meth)acrylates, trimethylol propane tri(meth)acrylate, triallylamine, triallyl cyanurate, triallyl isooyanurate, glycidyl (meth)acrylate, (poly)ethylene glycol, diethylene glycol, (poly)glycerol, propylene glycol, diethanol amine, trimethylol propane, pentaerythritol, (poly)ethylene glycol diglycidyl ether, (poly)glycerol polyglycidyl ether, eipchlorohydrin, ethylene diamine, polyethylene imine, (poly)aluminum chloride, aluminum sulfate, calcium chloride, and magnesium sulfate, for example. One member or a mixture of two or more member suitably selected from among the cross-linking agents cited above with due consideration for the reactivity thereof may be used.

In the production of the hydrated gel of absorbent resin (A), the polymer may be formed in conjunction with a graft bonding or a complex by performing the polymerization of the water-soluble unsaturated monomer in the presence of a hydrophilic polymeric compound such as starch, cellulose, or polyvinyl alcohol. The polymerization of the hydrated gel of absorbent resin (A) may be initiated by the use of a water-soluble radical polymerization initiator suitably selected from among ammonium persulfate, potassium persulfate, sodium persulfate, hydrogen peroxide, t-butyl hydroperoxide, and 2,2'-azo-bis-amidinopropane dihydrochloride, for example. The se of a persulfate such as ammonium persulfate, potassium persulfate, or sodium persulfate among other polymerization initiators cited above proves to be particularly preferable in point of further heighter of the polymerization ratio after the mixture of the hydrated gel (A) with the fine absorbent resin powder (B).

The fine absorbent resin powder (B) which can be used in this invention has an average particle diameter smaller than the average particle diameter which the hydrated gel of absorbent resin (A) mentioned above assumes on being reduced to a dried state and is in a substantially dry state. This fine absorbent resin powder (B) generally occurs in the form of undesirable minute particles mingling in the absorbent agent which is obtained by polymerizing and drying, as conventionally practiced, the water-insoluble unsaturated monomer selected from among the compounds cited above as starting materials for the hydrated gel of absorbent resin (A) and optionally containing a cross-linking agent. It is therefore, obtained by subjecting the absorbent agent produced by the conventional technique to classification as by means of special sieves.

The fine absorbent resin powder (B) is in a substantially dry state and is required to have an average particle diameter smaller than the average particle diameter which the hydrated gel of absorbent resin (A) assumes on being reduced to a dried state. If the fine absorbent resin powder (B) has a wetted state with water, the energy required for the subsequent step of drying increases. It is economically disadvantageous. And as a result of obstructing the occurrence of permeation such as of the monomer component from the hydrated gel of absorbent resin (A) to the fine absorbent resin powder (B), the strength of bonding between the fine absorbent resin powder (B) and the hydrated gel of absorbent resin (A) becomes fragile. Though the water content in the fine absorbent resin powder (B) is desired to be as small as possible, it is actually difficult to lower this water content to 0%. Generally, the desired water content is approximately in the range of from 1 to 10%.

If the average particle diameter of the fine absorbent resin powder (B) is larger than the average particle diameter which the hydrated gel of absorbent resin (A) assumes on being reduced to a dried state, the hydrated gel of absorbent resin (A) and the fine absorbent resin powder (B) cannot be amply mixed and united and the absorbent resin consequently produced assumes a firm particle structure only with difficulty.

Though the average particle diameter of the fine absorbent resin powder (B) varies with the average particle diameter of the hydrated gel of absorbent resin (A), it is desired to be in the range of from 0.001 to 20%, preferably from 0.01 to 10%, based on the average particle diameter which the hydrated gel of absorbent resin (A) assumes on being reduced to a dried state.

When the finally produced absorbent resin is to be used as a sanitary material such as a disposable diapers. This absorbent resin is often preferable to be removed of the portion thereof having particle diameters as in the range of from 1 to 149 μm. In this case, the fine absorbent resin powder (B) to be used is only required to be such that 90 to 100% by weight thereof comprises particles which have diameters falling in the range of from 1 to 149 μm. The average particle diameter of the hydrated gel of absorbent resin (A) may be fixed at the optimum value in due respect to the average particle diameter of the fine absorbent resin powder (B).

The amount of the fine absorbent resin powder (B) to be used herein is in the range of from 1 to 50 parts by weight, based on 100 parts by weight of the hydrated gel of absorbent resin (A). If this amount exceeds 50 parts by weight, the fine absorbent resin powder (B) is not allowed to form sufficient contact with the surface of the hydrated gel (B) and establish firm bonding with the hydrated gel (A). Conversely, if the amount is less than 1 part by weight, the effect commensurate with the execution of the method of this invention is not attained. Preferably, this amount is in the range of from 5 to 20 parts by weight.

The fine absorbent resin powder (B) and the hydrated gel of absorbent resin (A) may be identical or not identical in point of composition with each other. When the physical properties of the finally produced absorbent resin and the possibility of the procedure of this invention being repeated as described specifically herein below are taken into consideration, however, they are desired to have one and the same composition.

The method of polymerization for the production of the fine absorbent resin powder (B) may be identical or not identical with the method of polymerization adopted for the production of the hydrated gel of absorbent resin (A). When the affinity between these two components in point of particle from is taken into account, these two components are preferable to be similarly produced by aqueous solution polymerization.

Optionally, the fine absorbent resin powder (B) to be used herein may be in a form having a cross-linked surface region in each of the individual particles thereof. When the fine absorbent resin powder (B) which has undergone the cross-linking treatment is used, the mixture thereof with the hydrated gel of absorbent resin (A) takes place more uniformly and the consequent bending of the two components possibly enjoys improved firmness. In the mixing of the hydrated gel of absorbent resin (A) with the fine absorbent resin powder (B), any of the conventional mixing devices such as, for example, a V-shaped mixing device, a ribbon type mixing device, a paddle type mixing device, a screw type mixing device, a kneader, and a pressure type kneader can be used. For the purpose of allowing this mixing to proceed thoroughly and consequently enhancing the effect of this invention to the highest possible extend, a method which by the use of a mixing device of high shearing force enables the individual particles of the hydrated gel of absorbent rein (A) to undergo deformation during the mixing is adopted advantageously. A method which in the process of the mixing continues to stir and divide finely the individual particles of the hydrated gel of absorbent resin (A) with shear force is used more advantageously because it enables the fine absorbent resin powder (B) to be blended with the hydrated gel and efficiently sticked on the freshly cut surfaces of the gel particles.

As the mixing device which meets this purpose, a kneader or a pressure type kneader may be cited. When the polymerization of the hydrated gel of absorbent resin (A) is effected by the use of a reacting device such as the kneader, since the hydrated gel can be disintegrated and finely divided into particles of a desired average particle diameter along the progress of this polymerization, the operation of mixing the hydrated gel of absorbent resin (A) with the fine absorbent resin powder (B) obviates the necessity for using at separate device anew. Thus, this invention can be executed by one continuous process.

Otherwise, this invention can be executed by a method which comprises keeping the hydrated gel of absorbent resin (A) stirred and meanwhile adding the fine absorbent resin powder (B) intermittently or continuously to the stirred hydrated gel thereby effecting the mixing, a method which comprising adding the fine absorbent resin powder (B) all at once to the stirred hydrated gel (A) thereby effecting the mixing, a method which comprises adding the hydrated gel of absorbent resin (A) to the fine absorbent resin powder (B) and then stirring them together, or a method which comprises simultaneously feeding the hydrated gel of absorbent resin (A) and the fine absorbent resin powder (B) and continuously mixing them, for example. When this invention is executed by a method of continuous mixing, however, the feeding of the components must be completed so that the polymerization ratio of the hydrated gel of absorbent resin (A) falls in the range specified by this invention. This mixing is preferably to be carried out in an atmosphere of inert gas such as nitrogen so that the operation to be subsequently performed for the raising the polymerization ratio will not be obstructed.

During the process of mixing, the reaction system is desired to be maintained at a temperature in the range of from 50° to 100° C. so that the individual particles of the hydrated gel of absorbent resin (A) may be prevented from mutual adhesion, the mixing may be effected more efficiently, and the bonding of the hydrated gel (A) with the fine powder (B) will be obtained with increases firmness.

Optionally in this invention, the subsequent raising the polymerization ratio can be further ensured by adding a polymerization initiator, a reducing agent, etc. anew while the hydrated gel of absorbent resin (A) and the fine absorbent resin powder (B) are being mixed. The mixing may be carried out in the presence of a water-insoluble inorganic particulate substance such as, for example, silicon dioxide, titanium dioxide, aluminum oxide, talc, zeolite, bentonite, hydrotalcite, or montmorillonite. This measure possibly adds to the firmness with which the produced absorbent resin acquires the particle structure.

This invention is not accomplished unless the mixture of the hydrated gel of absorbent resin (A) and the fine absorbent resin powder (B) obtained by the method described above is subjected to raise the polymerization ratio to a level exceeding that reached during the mixing. This acceleration of polymerization may be attained by a method which comprises causing the mixture to be thermally aged as kept under a temperature most desirable for maintenance of the water content thereof at a proper level or a method which comprises thermally drying the mixture under conditions fit for increasing the polymerization ratio, for example, When no operation is performed for further raising the polymerization ratio as described above, the absorbent resin possessing a firm particle structure and avoiding regeneration of fine powder while being swelled with absorbed liquid as aimed at by this invention is not obtained. For the purpose of enhancing the strength of the absorbent resin and improving the efficiency of this invention to the highest possible extend, the acceleration of polymerization is preferable to heighten to a level in the range of from 99.9 to 100% in terms of the polymerization ratio of the finally produced absorbent resin.

Optionally, the absorbent resin which is obtained by this invention as described above may be further dried, pulverized, and classified so as to acquire a desired particle size.

When the process such as classification gives rise in the produced absorbent resin to a substantially dry fine absorbent resin powder (C) corresponding in point of particle size to the aforementioned undesirable unusually minute particles of the fine absorbent resin powder (B), the absorbent resin is preferable to be removed of this resin powder (C). By using this fine absorbent resin powder (C) as the fine absorbent resin powder (B) and mixing this resin powder with the hydrated gel of absorbent resin (A) obtained by a new step of polymerization thereby repeating the procedure described above at least once again, the absorbent resin which has a very narrow particle size distribution, possesses a firm particle structure incapable of regeneration of fine powder, and shows no difference of quality between batches can be produced continuously and efficiently.

This invention also provides a method for producing an absorbent resin cross-linked at surface region by mixing the absorbent resin to be treated obtained as described above with a cross-linking agent (D) and inducing a cross-linking reaction in the surface region of each of the individual particles of the absorbent resin to be treated.

The resultant absorbent resin having a cross-linked surface region, as compared with the absorbent resin to be treated having no cross-linked surface region, enjoys a firmer particle structure, retains this particle structure intact even on exposure to shear force while being swelled with absorbed liquid, possesses the same degree of strength as the primary particles, suffers regeneration of fine gel originating in fine powder only sparingly, and exhibits further improvement in various absorption characteristics such as, for example, absorptive capacity and liquid permeability.

In this case, the absorbent resin to be treated is preferable to be produced by mixing the fine absorbent resin powder (B) and the hydrated gel of absorbent resin (A), then raising the polymerization ratio of the hydrated gel of absorbent resin (A), and optionally drying for controlling water content to not more than 20% and further optionally pulverizing and classifying the resultant polymerized mixture into particles having an average particle diameter in the range of from 200 to 600 μm. If the water content of the produced absorbent resin to be treated is so high as to exceed 20%, the possibility ensues that the cross-linking agent (D) to be described specifically herein below will permeate to the cores of the resin particles to the extent of lowering the absorptive capacity.

When the produced absorbent resin to be treated is preparatorily removed of the substantially dry fine absorbent resin powder (C) which corresponds in particle size to the fine absorbent resin powder (B), the mixing of this absorbent resin with the cross-linking agent (D) may be uniformly carried out and the produced cross-linked absorbent resin having a cross-linked surface region may acquire firmer particle structure and enjoy a decrease in the content of fine powder.

From the viewpoints of various absorption characteristics, the ease with which the subsequent cross-linking reaction is carried out, and the strength of formed particles, the absorbent resin to be treated is desired to contain a carboxyl group. Specifically, it is desired to possess a polymerization unit originating in (meth)acrylic acid.

The cross-linking agent (D) has no particular restriction except for the requirement that it be capable of reacting with the functional group contained in the absorbent resin to be treated. The absorbent resins possessing a carboxyl group include polyhydric alcohols such as ethylene glycol, diethylene glycol, triethylene glycol, polyethylen glycol, glycerol, polyglycerol, propylene glycol, diethanol amine, triethanol amine, polypropylene glycol polyvinyl alcohol, pentaerythritol, 1,4-butanediol, 1,5-pentanediol, 1,6-hexanediol, sorbitol, sorbitan, mannitol, mannitan, sucrose, and glucose; polyhydrid glycidyl compounds such as ethylene glycol diglycidyl either, polyethylene glycol diglycidyl ether, and glycerin triglycidyl ether; haloepoxy compounds such as epichlorohydrin and α-methyl chlorohydrin; polyaldehydes such as glutaraldehyde and glyoxal; polyhydric amine compounds such as ethylene diamine and polyethylene imine; hydroxides, halogenides, carbonates, oxides, borax and other borates of metals of Group 2A, Group 3B, and Group 8 in the Periodic Table of Elements such as calcium hydroxide, calcium chloride, calcium carbonate, calcium oxide, magnesium chloro-borax, magnesium oxide, aluminum chloride, zinc chloride, and nickel chloride; and polyvalent metal compounds such as aluminum isopropoxide, for example. One member or a mixture of two or more members suitably selected from among the crosslinking agents cited above in due consideration of the reactivity may be used. From the standpoint of the strength of the particle structure of the produced absorbent resin having cross-linked surface region, the cross-linking agent to be used where the absorbent resin to be treated possesses a carboxyl group is preferable to be a polyhydric alcohol compound or a polyhydric glycidyl compound, preferably a polyhydric alcohol compound, among other cross-linking agents cited above. Considering the ability of permeation of cross-linking agents to the surface region of each of the individual particles of the absorbent resin to be treated, the cross-linking agent is preferable to be glycerol, trimethylol propane, or pentaerythritol, for example.

The amount of the cross-linking agent (D) to be used in this invention is desired to be in the range of from 0.01 to 10 parts by weight, preferably from 0.1 to 5 parts by weight, based on 100 parts by weight of the absorbent resin to be treated. So long as this amount is in the range mentioned above, the absorbent resin having cross-linked surface region to be produced retains a firmer particle structure even in the presence of shear during the swelling with absorbed water and excels in the handling property and absorption characteristics. If this amount exceeds 10 parts by weight, the excess is wasted without producing any proportionate addition to the expected effect and the proportion of the absorbent resin is decreased and the capacity of the absorbent resin for absorption is decreased. Conversely, if this amount is less tan 0.01 part by weight, the added cross-linking agent manifests only with difficulty the effect in improving the particle strength of the produced absorbent resin as compared with that of the absorbent resin to be treated. In this case, for the purpose of controlling the permeation of the cross-linking agent (D) into the absorbent resin to be treated and thereby optimizing the particle strength, it is desirable to use water or a hydrophilic organic solvent during the mixing of the cross-linking agent (D) with the absorbent resin. The use of water or the hydrophilic organic solvent contemplated here may be accomplished desirably by preparing the cross-linking agent in the form of an aqueous solution or a mixed solution consisting of the cross-linking agent and water or the hydrophilic organic solvent and adding the aqueous solution or the mixed solution to the absorbent resin to be treated. Thought the amount of water to be used in this case is variable with the amount of the cross-linking agent (D) and that of the hydrophilic organic solvent to be used, it is generally in the range of from 0.1 to 25% by weight, preferably form 0.5 to 10% by weight, based on 100% by weight of the absorbent resin to be treated. If the amount of water is less than 0.1% by weight, virtually no permeation of the cross-linking agent (D) into the absorbent resin to be treated takes place and the effect of the added cross-linking agent in improving the particle strength is manifested only with difficulty. If this amount exceeds 25% by weight, the produced absorbent resin may possibly suffer from a decreased absorptive capacity.

In this invention, an ordinary mixing device may be used for the mixing of the absorbent resin to be treated and the cross-linking agent (D). The mixing devices which are effectively usable herein include a V-shaped mixing device, a ribbon type mixing device, a screw type mixing device, a rotary disc type mixing device, and an air current type mixing device, for example. For the heat treatment of the mixture of the absorbent resin (C) as a base polymer and the cross-linking agent (D), a conventional drying device or heating furnace such as, for example, a groove type stirring drying device, a rotary drying device, a fluidized bed type drying device, an air current drying device, or an infrared drying device may be used. For the acceleration of the cross-linking reaction, generally application of heat to the site of reaction is desired. The temperature of this heat treatment is generally in the range of from 40° to 250° C. Particularly when the cross-linking agent (D) to be used in a polyhydric alcohol compound, the temperature of the heat treatment is desired to be not less than 90° C. and less than 230° C., preferably not less than 120° C. and less than 210° C. Optionally, the mixing and the heat treatment may be carried out simultaneously. The absorbent resin having cross-linked surface region of this invention which is obtained as described above, as compared with the absorbent resin to be treated, possesses a firmer particle structure virtually incapable of regeneration of fine powder even in the presence of shear during the swelling with absorbed liquid and excels in absorption characteristics.

When the cross-linked absorbent resin obtained as described above happens to contain the substantially dry fine absorbent resin powder (C') which corresponds in particle size to the fine absorbent resin powder (B), it is preferable to be removed of the resin powder (C'). By using this resin powder (C') as the fine absorbent resin powder (B) and mixing this resin powder with the hydrated gel of absorbent resin (A) and repeating this procedure at least once, the absorbent resin having cross-linked surface region which has a very narrow particle size distribution, possesses a firmer particle structure, and excels in various absorption characteristics can be produced continuously and efficiently.

The absorbent resin which is obtained as described above may have the surface characteristics thereof further modified by a conventional technique. Optionally, the produced absorbent resin may be furnished with new functions by being mixed with water-soluble polymer compound, deodorant, perfume, medicines, fertilizer, fungicide, antiseptic, foaming agent, pigment, dye, carbon black, activated carbon, and hydrophilic short fibers, for example.

Now, this invention will be described more specifically below with reference to working examples. It should be noted, however, that this invention is not restricted in any sense by these working examples. Polymerization ratio of the hydrated gel, average particle size and average particle size under dry state were determined by the following methods. The absorptive capacity, liquid permeability, ratio of regeneration of fine powder due to exposure to shock, and ratio of change of particle size in swollen state respectively of the absorbent resins obtained in the examples were determined by the following methods.

(a) Polymerization Ratio of Hydrated Gel 0.5 g of sampled hydrated gel was dispersed in 1,000 ml of deionized water, the dispersion was stirred for 2 hours and filtered though a filter paper, and measured an amount of residual monomer in the filtrate to determine the polymerization ratio from the amount of the residual monomer by using the following equation:

Polymerization ratio (%)=100 (%)-amount of the residual monomer in the hydrated gel (%).

(b) Average Particle Diameter of the hydrated Gel

Five grams of hydrated gel was charged into 1,200 g of 20% by weight of an aqueous sodium chloride solution and stirred by rotating a stirrer tip at 300 r.p.m. for 60 minutes. After stirring, all of the gel was charged to standard sieves (sieves having 9.5 mm, 2.5 mm, 0.85 mm, 0.60 mm, 0.3 mm and 0.075 mm of openings are piled in order) and the gel was classified by pouring 1,000 g of 20% by weight or pored aqueous sodium chloride solution. The classified gel weight (Wg) on each sieves were measured and each hypothetical opening R ($\alpha$), which would be the opening for original gel when sampled, for the classified gels on each sieves were calculated by the following equation, considering weight change of the gel in the 20% by weight aqueous sodium chloride solution. Each R($\alpha$) and weight percentage were plotted on a logarithmic probability paper. The average particle diameter (rG) of the hydrated gel was determined by reading the particle diameter corresponding 50% by weight.

$$R(\alpha)(mm) = \sqrt[3]{5(g)/\Sigma\omega(g)} \times \gamma$$

wherein
R($\alpha$): Opening (mm) of the hypothetical sieve for the classified gel if it were in the state of original solid content $\alpha$ (% by weight).
$\Sigma\omega$: Total weight of gel after classification (g)
$\gamma$: Opening (mm) of the sieve wherein swollen gel is classified with the 20% aqueous sodium chloride solution (c) Average particle diameter of the hydrated gel in dry state Average particle diameter (rD) in dry state was determined from the average particle diameter of the hydrated gel (rG) obtained in the above (b) using the following equation:

$$rD(mm) = rG(mm) \times \sqrt[3]{\alpha/100}$$

wherein $\alpha$ is solid content (%) of the hydrated gel
(1) Absorptive capacity This attribute was determined by uniformly placing about 0.2 g of a given absorbent resin in a tea bag type pouch (40 mm×150 mm), keeping the pouch immersed in a large excess physiological saline solution (an aqueous 0.9 wt. % NaCl solution) for 30 minutes thereby swelling the sample therein with the physiological saline solution, removing the wet pouch from the saline solution and allowing it to drain, weighting the wet pouch, repeating the procedure with an empty tea bag type pouch thereby finding the weight of the wet pouch, and performing a calculation in accordance with the following formula.

Absorptive capacity (g/g)=[Weight of wetted pouch (g) - Weight of wetted blank pouch (g)]/[Weight of absorbent resin used (g)]

(2) Liquid permeability

This property was determined by separating from a given absorbent resin a portion of particles 600 to 850 μm in diameter as a sample, placing 0.500 g of the sample in a glass tube measuring 16 mm in inside diameter and 18 cm in length and having the lower end thereof plugged with a silicone rubber stopper, pouring 30 ml of artificial urine into the glass tube, plugging the upper end of the glass tube with a silicone rubber stopper, allowing the sample in the glass tube to stand at rest for 30 minutes, then removing the silicone rubber stopper from the bottom side of the glass tube, setting the glass tube upright on a 48-mesh sieve placed on a beaker, removing the silicone rubber stopper from the upper end of the glass tube, allowing the glass tube containing the sample to stand at rest for 10 minutes, adding 10 ml of artificial urine to the sample downwardly from the upper end of the glass tube, and clocking the time in seconds required for the meniscus of the artificial urine to fall gradually and finally reach the upper surface of the gel of the sample. The numerical value of the time thus found as a criterion of wet gel strength and gel stability decreases in proportion as the particle strength of the sample increases, the possibility of the swelled gel shedding finely powdered gel and consequently inducing regeneration of fine particle gel diminishes. The absorbent resin with good liquid permeability shows excellent ability to allow diffusion of liquid therein when used as a sanitary material. The artificial urine used in the determination was prepared by combining 7 g of potassium chloride, 7 g of sodium sulfate, 2.975 g of ammonium dihydrogen phosphate, 0.525 g of diammonium hydrogen phosphate, 0.875 g potassium chloride (dihydrate), and 1.75 g of magnesium chloride (hexahydrate) by addition of deionized water to a total amount of 3.5 kg.

(3) Ratio of fine powder increased by impact

This attribute was determined by placing 30 g of a given absorbent resin consisting of particles of from 600 to 850 μm in diameter and 5 g of glass beads 5 mm in diameter in a container having an inner volume of 225 ml, shaking the container with a paint shaker for 30 minutes, and then measuring the amount (%) of particles of less than 149 μm in diameter produced in consequence of the impact. The numerical value of this amount decreases in proportion as the ease with which the sample regenerates fine powder under the impact decreases and the firmness of the particle structure increases.

(4) Charge rate of particle size due to swelling

This attribute was determined by preparing two beakers each having an inner volume of 100 ml and holding therein 75 g of artificial urine, adding 1 g of a given absorbent resin consisting of particles of from 600 to 850 μm in diameter to each of the beakers, allowing one of the absorbent resin dispersions to stand at rest and keeping the other absorbent resin dispersion stirred at 500 rpm with a magnetic stirrer for one hour, classifying the swelled gels with metal gauzes, 10 mesh (1,700 μm) and 200 mesh (74 μm), by allowing 1 liter of artificial urine to flow down the metal gauzes, and performing a calculation in accordance with the following formula.

Change rate (%) of particle size by swelling={b/(a+b)}×100 (%)

wherein a is the weight (G) of the gel remaining on the metal gauze of 10 mesh and b is the eight (g) of the gel remaining on the metal gauze of 200 mesh.

The numerical value of the change decreases in proportion as the possibility of the absorbent resin regenerating fine particle during the standing at rest while being swelled with artificial urine and on exposure to shear force dwindles and the persistence of firm particle structure grows.

REFERENTIAL EXAMPLE 1

In a jacketed twin arm type kneader of stainless steel having an inner volume of 10 liters and provided with two sigma type vanes, 4,400 g of an aqueous solution of a monomer component comprising 75 mol % of sodium acrylate and 25 mol % of acrylic acid (concentration of the monomer component 37% by weight) and 2.72 g of trimethylolpropane triacrylate (0.05 mol % based on the monomer component) as a cross-linking agent were placed and swept with nitrogen gas for displacement of the air entrapped therein. Then, with the two sigma type vanes set into rotation and the interior of the reaction system heated by circulating hot water at 30° C. through the jacket, 1.10 g of sodium persulfate and 1.10 g of sodium hydrogen sulfite were added as initiators to the reaction mixture. The aqueous monomer solution gradually formed a soft hydrated gel as polymerization advanced and the soft gel was gradually divided finely by the rotation of the vanes. After 40 minutes of the start of the polymerization, the polymer of the form of hydrated gel had been finely divided into particles of an average particle diameter of about 1.9 mm. The resultant polymer gel was dried on a metal net with hot air at a temperature of 150° C. for two hours. The dried polymer was pulverized by the use of a hammer mill fitted with a screen of 8 mm and then classified with a metal gauze of 20 mesh, to obtain an absorbent resin powder (1) for referential purpose.

EXAMPLE 1

The procedure of Referential Example 1 was repeated, except that 325 g of a fine absorbent resin powder (B-1) (powder comprising particles ranging from 1 to 149 μm in diameter having an average particle diameter of 95 μm and obtained by passing through a metal gauze of 100 mesh the absorbent resin powder existing before the step of classification in Referential Example 1) was added continuously over a period of 5 minutes to a hydrated gel of absorbent resin (A-1) occurring on elapse of 17 minutes following the start of the polymerization reaction and still undergoing the polymerization reaction. The hydrated gel of absorbent resin (A-1) at the start of the addition of the fine absorbent resin powder (B-1) had a polymerization ratio of 96.3%, an average particle diameter of 2.3 mm (as compared with the average particle diameter of 1.7 mm assumed by the absorbent resin while in a dried state), a water content of 61.4%, and a temperature of 81° C. By continuing the mixing under the application of shear force for 10 minutes after the completion of the addition, the hydrated gel (A-1) was further divided finely. When the mixing was ended, the temperature of the interior of the reaction system was 77° C. After the polymerization ratio of the hydrated gel of absorbent resin (A-1) was advanced by drying the resultant polymer gel with hot air at 150° C. for 2 hours, the dried polymer was pulverized and classified in the same manner as in Referential Example 1, to produce an absorbent resin (I-1). The polymerization ratio of this absorbent resin (I-1) was 99.95%. The properties of this absorbent resin (I-1) are shown in Table 1.

EXAMPLE 2

The procedure of Example 1 was repeated, except that the about of the fine absorbent resin powder (B-1) to be added was changed to 650 g and the addition of the fine absorbent resin powder (B-1) was started 20 minutes after the start of the polymerization reaction and continued over a period of 7 minutes thence. At the start of the addition, the hydrated gel of absorbent resin (A-2) had a polymerization ratio of 97.1%, an average particle diameter of 1.7 mm (as compared with the average particle diameter of 1.2 mm assumed by the absorbent resin while in a dried state), a water content of 62.0%, and a temperature of 77° C. The hydrated gel (A-2) was further divided by continuing the mixing under a shear force for two minutes following the completion of the addition. When the mixing was ended, the temperature inside the reaction system was 72° C. The polymerization ratio of the resultant hydrated gel of absorbent resin (A-2) was advanced by drying the hydrated gel with hot air at 150° C. for 2 hours. Then, the dried polymer was pulverized and classified in the same manner as in Referential Example 1, to produce an absorbent resin (I-2). The polymerization ratio of the absorbent resin (I-2) was 99.97%. The properties of the absorbent resin (I-2) are shown in Table 1.

EXAMPLE 3

The procedure of Example 1 was repeated, except that the amount of the fine absorbent resin powder (B-1) to be added was changed to 975 g and the addition of the fine absorbent resin powder (B-1) was started 14 minutes after the start of the polymerization reaction and continued over a period of 10 minutes thence. At the start of the addition, the hydrated gel of absorbent resin (A-3) had a polymerization ratio of 95.9%, an average particle diameter of 3.6 mm (as compared with the average particle diameter of 2.6 mm assumed by the absorbent resin while in a dried state), a water content of 61.1%, and a temperature of 86° C. The hydrated gel (A-3) was further divided by continuing the mixing under shear force for 5 minutes following the completion of the addition. At the end of mixing, the temperature inside the reaction system was 80° C. The polymerization ratio of the resultant hydrated gel of absorbent resin (A-3) was increased by drying the polymer gel with hot air at 150° C. for two hours. The dried polymer was pulverized and classified in the same manner as in Referential Example 1, to produce an absorbent resin (I-3). The polymerization ratio of this absorbent resin (I-3) was 99.97%. The properties of the absorbent resin (I-3) are shown in Table 1.

EXAMPLE 4

In a jacketed twin arm type kneader of stainless steel having an inner volume of 10 liters and provided with two sigma type vanes, 4,400 g of an aqueous solution of a monomer component comprising 75 mol % of sodium acrylate and 25 mol % of acrylic acid (concentration of the monomer component 37% by weight) and 1.13 g of N,N'- methylene bis-acrylamide (0.04 mol % based on the monomer component) as a cross-linking agent were placed and swept with nitrogen gas for displacement of the air entrapped in the reaction system. Then, with the two sigma type vanes set in rotation and the interior of the reaction system heated by circulating hot water at 30° C. through the jacket, 1.10 g of sodium persulfate and 1.10 g of sodium hydrogen sulfite were added as initiators to the reaction mixture. To the hydrated gel of absorbent resin (A-4) formed 25 minutes after the start of the polymerization, 490 g of a fine absorbent resin powder (B-2) (powder comprising particles measuring from 1 to 75 μm in diameter and having an average particle diameter of 65 μm and obtained by passing through a metal gauze of 200 mesh the absorbent resin powder existing before the classification in Referential Example 1) was added continuously over a period of six minutes and mixed therewith. At the start of the addition, the hydrated gel of absorbent resin (A-4) had a polymerization ratio of 98.0%, an average particle diameter of 0.7 mm (as compared with the average particle diameter of 0.5 mm assumed by the resin while in a dried state), a water content of 60.5%, and a temperature of 69° C. The hydrated gel (A-4) was further divided by continuing the mixing under shear force for 6 minutes following the completion of the addition. When the mixing was stopped, the temperature of the reaction system was 62° C. The polymerization ratio of the resultant hydrated gel of absorbent resin (A-4) was gained by drying the polymer gel with hot air at 150° C. for two hours. The dried polymer was pulverized and classified in the same manner as in Referential Example 1, to produce an absorbent resin (I-4). The polymerization ratio of this absorbent resin (I-4) was 99.94%. The properties of the absorbent resin (I-4) are shown in Table 1.

REFERENCE EXAMPLE 2

In the same twin arm type kneader as used in Referential Example 1, 4,400 g of an aqueous solution of a monomer component identical in composition with that used in Referential Example 1 and 4.25 g of N, N'-methylene bis-acrylamide (0.15 mol % based on the monomer component) as a cross-linking agent were placed and polymerized by following the procedure of Referential Example 1. The aqueous monomer solution gradually formed a soft hydrated gel as the polymerization advanced and this soft hydrated gel was gradually divided finely by the rotation of the vanes. Within 30 minutes of the start of the polymerization, the hydrated gel had been finely divided into particles having an average particle diameter of about 5 mm. The polymer gel thus obtained was dried on a metal net with hot air at 150° C. for two hours. The dried polymer was pulverized with a hammer mill fitted with a screen of 15 mm and then classified with a metallic gauze of 10.5 mesh, to produce an absorbent resin powder (2) for referential purpose.

EXAMPLE 5

The procedure of Referential Example 2 was repeated, except that 590 g of a fine absorbent resin powder (B-3) (powder comprising particles ranging from 1 to 500 μm in diameter and having an average particle diameter of 290 μm and obtained by passing through a metallic gauze of 32 mesh the absorbent resin powder existing before the step of classification in Referential Example 2) was continuously added over a period of eight minutes to a hydrated gel of absorbent resin (A-5) existing 7 minutes after the start of the polymerization reaction and then mixed therewith. At the start of the addition, the hydrated gel of absorbent resin (A-5) had a polymerization ratio of 86.4%, an average particle diameter of 15 mm (as compared with the average particle diameter of 11 mm assumed by the absorbent resin while in a dried state), a water content of 62.4%, and a temperature of 75° C. The hydrated gel (A-5) was further divided by continuing the mixing under shear force for 10 minutes after the completion of the addition. After the completion of the mixing, the temperature of the interior of the reaction system was 74° C. The polymerization ratio of the hydrated gel of absorbent resin (A-5) was advanced by drying the polymer gel with hot air at 150° C. for 2 hours. The dried polymer was pulverized and classified in the same manner as in Referential Example 1, to produce an absorbent resin (I-5). The polymerization ratio of this absorbent resin (I-5) was 99.97%. The properties of the absorbent resin (I-5) are shown in Table 1.

EXAMPLE 6

The procedure of Referential Example 1 was repeated except that 325 g of the fine absorbent resin powder (B-1) (powder comprising particles ranging from 1 to 149 μm in diameter and having an average particle diameter of 95 μm and produced by passing through a metal gauze of 100 mesh the absorbent resin powder existing before the step of classification in Referential Example 1) was continuously added over a period of 5 minutes to a hydrated gel of absorbent resin (A-6) existing 5 minutes after the start of the polymerization and mixed therewith. At the start of the addition, the hydrated gel of absorbent resin (A-6) had a polymerization ratio of 74.2%, an average particle diameter of 35 mm (as compared with the average particle diameter of 25 mm assumed by the absorbent resin while in a dried state), a water content of 61.8%, and a temperature of 62° C. The hydrated gel (A-6) was further divided by continuing the mixing under shear force for 10 minutes after the completion of the addition. At the end of the mixing, the temperature of the interior of the reaction system was 60° C. The polymerization ratio of the hydrated gel of absorbent (A-6) was advanced by drying the polymer gel with hot air at 150° C. for 2 hours. The dried polymer was pulverized and classified in the same manner as in Referential Example 1, to produce an absorbent resin (I-6). The polymerization ratio of this absorbent resin (I-6) was 99.96%. The properties of the absorbent resin (I-6) are shown in Table 1.

EXAMPLE 7

In the same twin arm type kneader as used in Referential Example 1, 4,400 g of an aqueous solution of a monomer component comprising 75 mol % of sodium acrylate and 25 mol % of acrylic acid (concentration of the monomer component 20% by weight) and 2.30 g of N,N'-methylene bis-acrylamide (0.15 mol % based on the monomer component) as a cross-linking agent were placed and swept with nitrogen gas for displacement of the air entrapped in the reaction system. Then, with the two sigma type vane set into rotation and the interior of the reaction system heated by circulation of hot water at 40° C. through the jacket, 1.10 g of sodium persulfate and 1.10 f of sodium hydrogen sulfite were added as initiators to the reaction mixture. The aqueous monomer solution gradually formed a soft hydrated gel as the polymerization advanced and the hydrated gel was gradually divided finely by the rotation of the vanes. The procedure of Referential Example 1 was repeated, except that 1,730 g of the fine absorbent resin powder (B-1) (powder comprising particles measuring from 1 to 149 μm in diameter and having an average particle diameter of 95 μm and obtained by passing through a metal gauze of 100 mesh the absorbent resin powder existing before the step of classification in Referential Example 1) was continuously added over a period of 15 minutes to a hydrated gel of absorbent resin (A-7) existing 35 minutes after the start of the polymerization and mixed therewith. At the start of the addition, the hydrated gel of absorbent resin (A-7) had a polymerization ratio of 97.8%, an average particle diameter of 1.8 mm (as compared with the average particle diameter of 1.1 mm assumed by the absorbent resin while in a dried state), a water content of 80.2%, and a temperature of 45° C. The hydrated gel (A-7) was further divided finely by continuing the mixing under shear force for 30 minutes following the completion of the addition. After the completion of the mixing, the temperature of the interior of the reaction system was 40° C. The polymerization ratio of the hydrated gel of absorbent resin (A-7) was advanced by drying the polymer gel with hot air at 150° C. for two hours. The dried polymer was pulverized and classified in the same manner as in Referential Example 1, to produce an absorbent resin (I-7). The polymerization ratio of this absorbent resin (I-7) was 99.95%. The properties of the absorbent resin (I-7) are shown in Table 1.

EXAMPLE 8

In the same twin arm type kneader as used in Referential Example 1, 4,000 g of an aqueous solution of a monomer component comprising 55 mol % of sodium acrylate and 45 mol % of acrylic acid (concentration of the monomer component 48% by weight) and 3.42 g of N,N'-methylene bis-acrylamide (0.10 mol % based on the monomer component) as a cross-linking agent were placed and then swept with nitrogen gas for displacement of the air entrapped in the reaction system. Then, with the two sigma type vanes set into rotation and the interior of the reaction system heated by circulating hot water at 15° C. through the jacket, 0.69 g of sodium persulfate and 0.69 g of sodium hydrogen sulfite were added as initiators to the reaction mixture. The aqueous monomer solution gradually formed a soft hydrated gel as the polymerization advanced and the hydrated gel was gradually divided finely by the rotation of the vanes. The procedure of Referential Example 1 was repeated, except that 190 g of the fine absorbent resin powder (B-1) (powder comprising particles ranging from 1 to 149 μm in diameter and having an average particle diameter of 95 μm and obtained by passing through a metal gauze of 100 mesh the absorbent resin powder existing before the step of classification in Referential Example 1) was continuously added over a period of 5 minutes to a hydrated gel of absorbent resin (A-8) existing 20 minutes after the start of the polymerization and mixed therewith. At the start of the addition, the hydrated gel of absorbent resin (A-8) had a polymerization ratio of 98.7%, an average particle diameter of 5.3 mm (as compared with the average particle diameter of 4.1 mm assumed by the absorbent resin while in a dried state), a water content of 52.3%, and a temperature of 90° C. The hydrated gel (A-8) was further divided finely by continuing the mixing under shear force for 15 minutes following the completion of the addition. The polymerization ratio of the hydrated gel of absorbent resin (A-8) was advanced by drying the polymer gel with hot air at 150° C. for 2 hours. The dried polymer was pulverized and classified in the same manner as in Referential Example 1, to produce an absorbent resin (I-8). The polymerization ratio of this absorbent resin (I-8) was 99.98%. The properties of the absorbent resin (I-8) are shown in Table 1.

EXAMPLE 9

An absorbent resin (II-1) was obtained by mixing 100 parts by weight of the absorbent resin (I-1) obtained in Example 1 with an aqueous liquid comprising 0.5 part by weight of glycerol as a cross-linking agent, 2 parts by weight of water, and 0.5 part by weight of isopropyl alcohol by the use of a screw type mixing device and heating the resultant mixture in a drying device at 200° C. for 20 minutes. The properties of the absorbent resin (II-1) are shown in Table 1.

EXAMPLE 10

An absorbent resin (II-2) was obtained by further classifying the absorbent resin (I-1) obtained in Example 1 with a metal gauze of 100 mesh (having an opening of 150 μm), mixing 100 parts by weight of an absorbent resin (I-1) remaining on the metal gauze of 100 mesh with an aqueous liquid comprising 1 part by weight of trimethylol propane, 4 parts by weight of water, and 1 part by weight of ethanol, placing the resultant mixture in a ribbon blender having the jacket thereof heated to 190° C. with a thermal medium, and heating and mixing the mixture therein for 30 minutes. The properties of the absorbent resin (II-2) are shown in Table 1.

EXAMPLE 11

An absorbent resin (II-3) was obtained by continuously supplying 100 parts by weight of the absorbent resin (I-2) obtained in Example 2 and an aqueous liquid comprising 0.05 part by weight of ethylene glycol diglycidyl ether as a cross-linking agent, 8 parts by weight of water, and 1 part by weight of methanol at respective fixed rates to a paddle dryer heated with a thermal medium at 150° C., and mixing them and giving them a surface treatment therein. The average retention time of the reaction mixture in the paddle dryer was 10 minutes. The properties of the absorbent resin (II-3) are shown in Table 1.

EXAMPLE 12

The procedure of Referential Example 1 was repeated, except that 325 g of a fine absorbent resin powder (B-4) {powder comprising particles ranging from 1 to 149 μm in diameter and having an average particle diameter of 75 μm and obtained by passing through a metal gauze of 100 mesh the absorbent resin (II-1) obtained in Example 9} was continuously added over a period of 5 minutes to a hydrated gel of absorbent resin (A-12) existing 18 minutes after the start of the polymerization reaction and still undergoing the polymerization reaction. At the start of the addition, the hydrated gel of absorbent resin (A-12) had a polymerization ratio of 96.7%, an average particle diameter of 2.4 mm (as compared with the average particle diameter of 1.7 mm assumed by the absorbent resin while in a dried state), a water content of 61.2%, and a temperature of 80° C. the hydrated gel (A-12) was further divided finely by continuing the mixing under shear force for 10 minutes following the completion of the addition. At the end of the mixing, the temperature of the interior of the reaction system was 76° C. The polymerization ratio of the hydrated gel of absorbent resin (A-12) was advanced by drying the polymer gel with hot air at 150° C. for two hours. The dried polymer was pulverized and classified with a metal gauze of 20 mesh (having an opening of 850 μm) in the same manner as in Referential Example 1, to produce an absorbent resin (I-9). An absorbent resin (II-4) was obtained by mixing 100 parts by weight of the absorbent resin (I-9) with an aqueous liquid comprising 0.5 part by weight of glycerol as a cross-linking agent, 2 part by weight of water, and 0.5 part by weight of isopropyl alcohol, blending the resultant mixture in a screw type mixing device, and heating the resultant blend in a drying device at 200° C. for 20 minutes. This absorbent resin (II-4) was classified with a metal gauze of 100 mesh (having an opening of 149 μm) and the portion of the resin stopped on the metal gauze of 100 mesh was separated as an absorbent resin (II-4). The properties of this absorbent resin (II-4) are shown in Table 1.

CONTROL 1

In the twin arm type kneader of the same reaction vessel as used in Referential Example 1, 1,600 g of the dry polymer before pulverization obtained in Referential Example 1 uniformly swelled by adding 2,600 g of deionized water at 98° C. and heating through the jacket. The resultant hydrated gel of absorbent resin (A-13) had a polymerization ratio of 99.95%, an average particle diameter of 1.9 mm (as compared with the average particle diameter of 1.4 mm assumed by the absorbent resin while in a dried state), a water content of 61.9%, and a temperature of 78° C. This hydrated gel of absorbent resin (A-13) and 325 g of the same fine absorbent resin powder (B-1) as used in Example 1 continuously added thereto over a period of 5 minutes were mixed. At the end of this mixing, the temperature of the interior of the reaction system was 75° C. An absorbent resin (1) for comparison was obtained by drying, pulverizing, and classifying the resultant polymer gel in the same manner as in Referential Example 1. The polymerization ratio of this dried produce was 99.96%. The properties of the absorbent resin (1) for comparison are shown in Table 1.

CONTROL 2

An integrated continuously glutinous swollen hydrated gel was obtained by kneading 250 g of the same fine absorbent resin powder (B-1) as used in Example 1 with 750 g of purified water. The hydrated gel was torn into small pieces and dried by being left standing in a drying device at 95° C. for three hours. An absorbent resin powder (2) for comparison was obtained by pulverizing and classifying the dried hydrated gel under the same conditions as in Referential Example 1. The properties of the absorbent resin powder (2) for comparison are shown in Table 1.

CONTROL 3

An integrated continuously glutinous swollen hydrated gel was obtained by kneading 500 g of the same fine absorbent resin powder (B-1) as used in Example 1 with 1,000 g of purified water. This hydrated gel was finely divided by the use of a meat chopper. An absorbent resin powder (3) for comparison was obtained by annually mixing 1,000 g of the finely divided gel with 4,000 g of the polymer of the form of hydrated gel obtained in Referential Example 1, and drying, pulverizing, and classifying the resultant mixture in the same manner as in Referential Example 1. The properties of the absorbent resin powder (3) for comparison are shown in Table 1.

CONTROL 4

The absorbent resin powder (1) for referential purpose obtained in Referential Example 1 was classified with a metal gauze of 100 mesh. An absorbent resin powder A containing 15% of particles ranging from 1 to 149 μm was obtained by combining the powder which had passed through the metal gauze of 100 mesh and the powder which had remained on the metal gauze of 100 mesh. An absorbent resin (4) for comparison was obtained by mixing uniformly 100 parts by weight of the absorbent resin powder A and 5 parts by weight of water with the aid of a sand turbo (produced by Hosokawa Micron K. K.) and disintegrating the resultant mixture by the use of a flush mill (produced by Fuji Powder K. K.). The properties of the absorbent resin (4) for comparison are shown in Table 1.

CONTROL 5

A continuous hydrated gel was obtained by kneading by the use of a kneader an aqueous liquid obtained by dissolving 7.5 g of ethylene glycol diglycidyl either in 500 g of purified water and 500 g of the same fine absorbent resin powder (B-1) as used in Example 1. By finely dividing this hydrogen in a kneader, there was obtained a gel having a water content of 49.5% and an average particle diameter of 2.5 mm (as compared with the average particle diameter of 2.0 mm assumed by the absorbent resin while in a dried state). An absorbent resin (5) for comparison was obtained by drying the produced gel with hot air at 90° C. for 2 hours and pulverizing and classifying the dried polymer in the same manner as in Referential Example 1. The properties of the absorbent resin (5) for comparison are shown in Table 1.

CONTROL 6

An absorbent resin (6) for comparison was obtained by combining 100 parts by weight of the absorbent resin (2) for comparison obtained in Control 2 with an aqueous liquid comprising 1 part by weight of trimethylol propane, 4 parts by weight of water, and 1 part by weight of ethanol, placing the resultant mixture in a ribbon blender having the jacket thereof kept heated at 190° C. with a thermal medium, and heating and mixing it for 30 minutes. The properties of the aqueous resin (6) for comparison are shown in Table 1.

CONTROL 7

The procedure of Referential Example 1 was repeated, except that 325 g of the fine absorbent resin powder (B-1) was continuously added over a period of 10 minutes to a hydrated gel of absorbent resin (A-14) existing 2 minutes after the start of the polymerization reaction and still undergoing the polymerization reaction. At the start of the addition, the hydrated gel of absorbent resin (A-14) had a polymerization ratio of 30.5%, an average particle diameter of 40 mm (as compared with the average particle diameter of 29 mm assumed by the absorbent resin while in a dried state), a water content of 61.3%, and a temperature of 42° C. The hydrated gel (A-14) was further divided finely by continuing the mixing under shear force for 15 minutes. An absorbent resin (7) for comparison was obtained by drying the resultant polymer gel with hot air at 150° C. for 2 hours and pulverizing the dried polymer and classifying the produced powder with a metal gauze of 20 mesh in the same manner as in Referential Example 1. The polymerization ratio of the absorbent resin (7) for comparison was 99.50%. The properties of this absorbent resin powder (7) are shown in Table 1.

CONTROL 8

The procedure of Example 1 was repeated, except that the amount of the fine absorbent resin powder (B-1) to be added was changed to 4,400 g and the addition of the fine absorbent resin powder (B-1) was started 10 minutes after the start of the polymerization reaction and continued over a period of 150 minutes thence. At the start of the addition, the hydrated gel of absorbent resin (A-15) had a polymerization ratio of 92.3%, an average particle diameter of 5.2 mm (as compared with the average particle diameter of 3.7 mm assumed by the absorbent resin while in a dried state), a water content of 61.8%, and a temperature of 82° C. The hydrated gel (A-15) was further divided finely by continuing the mixing under shear force for two minutes. At the end of the mixing under shear force for two minutes. At the end of the mixing, the temperature of the interior of the reaction system was 78° C. The polymerization ratio of the hydrated gel of absorbent resin (A-15) was advanced by drying the resultant polymer gel with hot air at 150° C. for 2 hours. An absorbent resin (8) for comparison was obtained by pulverising and classifying the dried polymer in the same manner as in Referential Example 1. The polymerization ratio of the absorbent resin (8) for comparison was 99.95%.

The properties of the absorbent resin (8) for comparison are shown in Table 1.

It is clearly noted from Table 1 that the absorbent resins (I-1 to I-8) obtained in accordance with this invention, in spite of the addition thereto of minute particles of an unwanted small diameter in the process of polymerization, possess a firm particle structure, allow no easy regeneration of a fine powder or a gel originating in a fine powder on exposure to a shock or when swelled with absorbed water, promise an ideal work environment while they are being conveyed through a plant line, transported on a vehicle, or used in various applications, and excel in various absorption characteristics such as absorptive capacity, liquid permeability, and ability to permit diffusion of liquid. The absorbent resins (II-1 to II-4) obtained by this invention are capable of retaining the firm particle structure even under shear force when being swelled with absorbed aqueous liquid and exhibiting outstanding performance while in use in a broad range of applications in addition to enjoying the characteristics mentioned above.

TABLE 1

| | Absorbent resin produced | Absorptive capacity (g/g) | Liquid permeability (sec) | Ratio of regeneration of fine powder due to impact (%) | Charge rate of particle size when swelled with artificial urine | |
|---|---|---|---|---|---|---|
| | | | | | (0rpm) (%) | (500rpm) (%) |
| Example 1 | Absorbent resin (I-1) | 47 | 42 | 3.5 | 4.3 | 5.8 |
| Example 2 | Absorbent resin (I-2) | 47 | 37 | 5.2 | 6.8 | 7.2 |
| Example 3 | Absorbent resin (I-3) | 46 | 97 | 6.3 | 8.2 | 8.9 |
| Example 4 | Absorbent resin (I-4) | 48 | 61 | 5.1 | 5.2 | 6.2 |
| Example 5 | Absorbent resin (I-5) | 41 | 25 | 3.2 | 4.8 | 5.7 |
| Example 6 | Absorbent resin (I-6) | 44 | 32 | 5.8 | 4.8 | 5.1 |

TABLE 1-continued

| | Absorbent resin produced | Absorptive capacity (g/g) | Liquid permeability (sec) | Ratio of regeneration of fine powder due to impact (%) | Charge rate of particle size when swelled with artificial urine | |
|---|---|---|---|---|---|---|
| | | | | | (0rpm) (%) | (500rpm) (%) |
| Example 7 | Absorbent resin (I-7) | 47 | 45 | 7.1 | 6.3 | 8.2 |
| Example 8 | Absorbent resin (I-8) | 48 | 48 | 7.3 | 6.1 | 7.7 |
| Example 9 | Absorbent resin (II-1) | 43 | 10 | 0.5 | 0.7 | 1.6 |
| Example 10 | Absorbent resin (II-2) | 44 | 8 | 0.6 | 0.8 | 2.1 |
| Example 11 | Absorbent resin (II-3) | 42 | 10 | 0.5 | 0.6 | 1.7 |
| Example 12 | Absorbent resin (II-4) | 44 | 9 | 0.7 | 0.9 | 2.3 |
| Control 1 | Absorbent resin for comparison (1) | 49 | >2400 | 12.2 | 12.5 | 21.0 |
| Control 2 | Absorbent resin for comparison (2) | 48 | >2400 | 14.7 | 13.2 | 22.2 |
| Control 3 | Absorbent resin for comparison (3) | 47 | 600 | 10.8 | 11.5 | 18.2 |
| Control 4 | Absorbent resin for comparison (4) | 46 | 530 | 9.7 | 12.1 | 13.2 |
| Control 5 | Absorbent resin for comparison (5) | 32 | 20 | 3.5 | 3.2 | 4.3 |
| Control 6 | Absorbent resin for comparison (6) | 43 | 750 | 9.3 | 10.2 | 13.2 |
| Control 7 | Absorbent resin for comparison (7) | 33 | 65 | 3.8 | 4.8 | 6.1 |
| Control 8 | Absorbent resin for comparison (8) | 42 | 550 | 18.2 | 22.0 | 42.8 |

What is claimed is:

1. A method for the production of an absorbent resin, which method comprises mixing 100 parts by weight of (A) a hydrated gel of an absorbent resin which is resulted from aqueous solution polymerization having a polymerization ratio in the range of from 60 to 99%, an average particle diameter in the range of from 0.1 to 20 mm, a water content in the range of from 30 to 90% by weight, and a temperature in the range of from 40° to 110° C., with from 1 to 50 parts by weight of (B) a fine absorbent resin powder having a water content of 0.1 to 10% by weight and an average particle diameter smaller than the average particle diameter assumed by said hydrated gel of absorbent resin (A) while in a dried state, then raising the polymerization ratio of said hydrated gel of absorbent resin (A) to a level higher than the polymerization ratio of said hydrated gel when being mixed.

2. A method according to claim 1, wherein the average particle diameter of said fine absorbent resin powder (B) is in the range of from 0.001 to 20%, based on the average particle diameter which said hydrated gel of absorbent resin (A) assumes while in a dried state.

3. A method according to claim 1, wherein said mixing is carried out in the presence of shear force.

4. A method according to claim 3, wherein said mixing is carried out so as to cause said hydrated gel of absorbent resin (A) to be stirred and finely pulverized with shear force.

5. A method according to claim 4, wherein said mixing is carried out by the use of a kneader.

6. A method according to claim 1, wherein the polymerization ratio of said hydrated gel of absorbent resin (A) is raised to a level in the range of from 99.9 to 100% after the step of said mixing.

7. A method according to claim 1, wherein the polymerization ratio of said hydrated gel of absorbent resin (A) is in the range of from 80 to 98%.

8. A method according to claim 1, wherein the water content of said hydrated gel of absorbent resin (A) is in the range of from 55 to 75% by weight.

9. A method according to claim 1, wherein from 90 to 100% by weight of said fine absorbent resin powder (B) has particle diameters in the range of from 1 to 149 μm.

10. A method according to claim 1, wherein the amount of said fine absorbent resin powder (B) to be mixed is in the range of from 5 to 20 parts by weight.

11. A method according to claim 1, wherein the temperature at which said mixing is carried out is kept in the range of from 50° to 100° C.

12. A method according to claim 1, wherein the polymerization of said hydrated gel of absorbent resin (A) is carried out by the use of a persulfate as a polymerization initiator.

13. A method according to claim 1, wherein said hydrated gel of absorbent resin (A) is a hydrated gel of cross-linked polyacrylate having a neutralization ratio in the range of from 30 to 90%.

14. A method according to claim 1, wherein said fine absorbent resin powder (B) has been produced by aqueous solution polymerization.

15. A method according to claim 1, wherein said fine absorbent resin powder (B) is a cross-linked polyacrylate having a neutralization ratio in the range of from 30 to 90%.

16. A method according to claim 1, wherein a polymerization initiator is added anew in the process of mixing.

17. A method according to claim 1, wherein a water-insoluble fine inorganic powder is added in the process of mixing.

18. A method according to claim 1, wherein said hydrated gel of absorbent resin (A) is dried and pulverized after the polymerization ratio thereof is raised to a level higher than the polymerization ratio existing in the process of mixing and then removing from said absorbent resin a substantially dry absorbent resin powder (C) having a particle size corresponding to the particle size range of said fine absorbent resin powder (B) by means of classification.

19. A method according to claim 18, wherein said substantially dry absorbent resin powder (C) removed from said absorbent resin and having a particle size corresponding to the particle size range of said fine absorbent resin powder (B) is recycled as a source for said fine absorbent resin powder (B).

20. A method for the production of an absorbent resin having a cross-linked surface region each in the individual particles thereof, which method comprises mixing 100 parts by weight of (A) a hydrated gel of an absorbent resin which is resulted from aqueous solution polymerization having a polymerization ratio in the range of from 60 to 99%, an average particle diameter in the range of from 0.1 to 200 mm, a water content in the range of from 30 to 90% by weight, and a temperature in the range of from 40° to 110° C., with from 1 to 50 parts by weight of (B) a substantially dry fine absorbent resin powder having an average particle diameter smaller than the average particle diameter assumed by said hydrated gel of the absorbent resin (A) while in a dried state, then raised the polymerization ratio of said hydrated gel of absorbent resin (A) to a level higher than the polymerization ratio of said hydrated gel when being mixed thereby forming an absorbent resin to be treated, and mixing said absorbent resin to be treated with (D) a cross-linking agent and subjecting the resultant mixture to a cross-linking reaction.

21. A method according to claim 20, wherein said absorbent resin to be treated possesses a carboxyl group.

22. A method according to claim 21, wherein said cross-linking agent (D) is a compound capable of reacting with a carboxyl group.

23. A method according to claim 20, wherein the water content of said absorbent resin to be treated is not more than 20%.

24. A method according to claim 20, wherein the average particle diameter of said absorbent resin to be treated is in the range of from 200 to 600 µm.

25. A method according to claim 20, wherein said cross-linking agent (D) is used in an amount in the range of from 0.01 to 10 parts by weight, based on 100 parts by weight of said absorbent resin to be treated.

26. A method according to claim 22, wherein said cross-linking agent (D) is a polyhydric alcohol compound or a polyhydric glycidyl ether compound.

27. A method according to claim 26, wherein said cross-linking agent (D) is a polyhydric alcohol compound.

28. A method according to claim 27, wherein said polyhydric alcohol compound is at least one member selected from the group consisting of glycerol, pentaerythritol, and trimethylol propane.

29. A method according to claim 20, wherein said cross-linking reaction is carried out at a temperature in the range of from 90° to 230° C.

30. A method according to claim 20, wherein said cross-linking agent (D) is used as an aqueous solution.

31. A method according to claim 30, wherein the amount of water is in the range of from 0.1 to 25 parts by weight, based on 100 parts by weight of said absorbent resin to be treated.

32. A method according to claim 20, wherein the polymerization ratio of said hydrated gel of absorbent resin (A) is raised to the level of the polymerization ratio assumed by said absorbent resin in the process of mixing, then said substantially dry absorbent resin powder (C) corresponding in particle size range to said fine absorbent resin powder (B) is removed from said absorbent resin to be treated by means of classification, and the absorbent resin to be treated less the absorbent resin powder (C) is mixed with said cross-linking agent (D) and subjected to said cross-linking reaction.

33. A method according to claim 32, wherein said substantially dry absorbent resin powder (C) removed from said absorbent resin and having a particle size corresponding in particle size range to said fine absorbent resin powder (B) is recycled as a source for said fine absorbent resin powder (B).

34. A method according to claim 20, wherein said absorbent resin to be treated is mixed with said cross-linking agent (D) and subjected to said cross-linking reaction and then said absorbent resin powder (C') corresponding in particle size range to said fine absorbent resin powder (B) is removed from the resultant cross-linked absorbent resin by means of classification.

35. A method according to claim 34, wherein said absorbent resin powder (C') is recycled as a source for said fine absorbent resin powder (B).

36. The method according to claim 1, wherein said average particle diameter is in the range of from 0.1 to 35 mm.

37. The method according to claim 1, wherein said fine absorbent powder has a water content of less than 10% by weight.

38. The method according to claim 1, wherein said fine absorbent powder has a water content which does not obstruct the occurrence of permeation thus reducing the strength of bonding between the fine absorbent resin powder (B) and the hydrated gel of absorbent resin (A).

\* \* \* \* \*